United States Patent
Nakakita et al.

(10) Patent No.: US 7,222,044 B2
(45) Date of Patent: May 22, 2007

(54) ROTATING SPEED DETECTING APPARATUS

(75) Inventors: Osamu Nakakita, Kanagawa-ken (JP); Masayuki Morimoto, Hyogo-ken (JP); Takao Sakurai, Aichi-ken (JP); Mitsugu Nakamura, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/337,594

(22) Filed: Jan. 24, 2006

(65) Prior Publication Data
US 2006/0190213 A1 Aug. 24, 2006

(30) Foreign Application Priority Data
Feb. 23, 2005 (JP) ............................. 2005-047992

(51) Int. Cl.
*G01P 3/00* (2006.01)
(52) U.S. Cl. ..................................... 702/147
(58) Field of Classification Search ................ 702/96, 702/142, 145–148
See application file for complete search history.

(56) References Cited

U.S. PATENT DOCUMENTS

| | | | |
|---|---|---|---|
| 4,885,710 A | 12/1989 | Hersberger et al. | |
| 5,138,639 A | 8/1992 | Nakamura | |
| 6,219,624 B1 | 4/2001 | Russ | |
| 7,058,537 B2 * | 6/2006 | Sutter et al. | ............... 702/150 |

FOREIGN PATENT DOCUMENTS

| | | |
|---|---|---|
| DE | 10227523 A1 | 12/2003 |
| EP | 0341445 A1 | 11/1989 |
| EP | 0401757 A2 | 12/1990 |
| JP | 10-38906 A | 2/1998 |

* cited by examiner

*Primary Examiner*—Michael Nghiem
(74) *Attorney, Agent, or Firm*—Birch, Stewart, Kolasch & Birch, LLP

(57) ABSTRACT

A rotating speed detecting apparatus has: a bearing sensor configured to detect rotation of a motor and output detection pulses whose frequency depending on a rotating speed of the motor; and a calculating unit configured to receive the detection pulses from the bearing sensor. The detection pulses include a first pulse and a second pulse output next to the first pulse. The calculating unit calculates a revolution of the motor from a pulse interval between the first pulse and the second pulse.

16 Claims, 6 Drawing Sheets

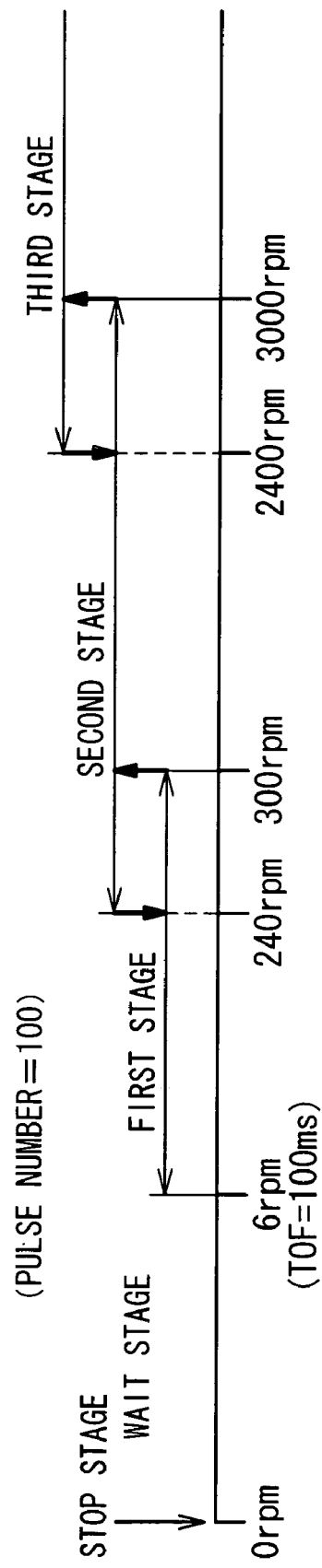

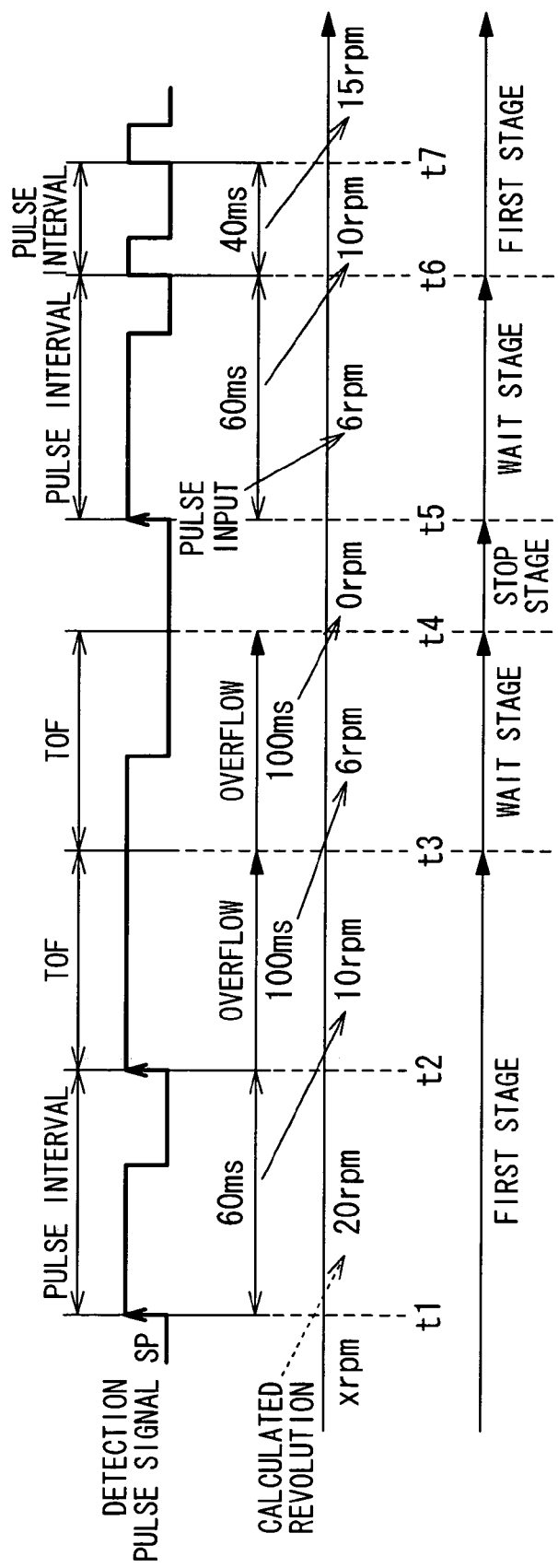

ROTATING SPEED DETECTING APPARATUS

BACKGROUND OF THE INVENTION

1. Field of the Invention

The present invention relates to a rotating speed detecting apparatus. In particular, the present invention relates to a rotating speed detecting apparatus having a bearing sensor.

2. Description of the Related Art

A sensor for detecting rotation of a motor has been known in the past. The sensor outputs detection pulses indicating that the rotation of the motor is detected. For example, the sensor outputs thousands of detection pulses when the motor makes one rotation. A calculating unit connected to the sensor receives the detection pulses, and is able to calculate a revolution (rotating speed) of the motor based on the number of the received detection pulses. The calculated revolution is used for controlling a vehicle equipped with the motor.

FIG. 1 is a figure for explaining a conventional method of calculating the rotating speed. Output pulses (output pulse group) output from the sensor are shown in FIG. 1. According to the conventional technique, the revolution of the motor is calculated (estimated) by counting the number of the output pulses in a predetermined sampling period. The count value becomes larger, as the motor rotates at a higher speed. The count value becomes smaller, as the motor rotates at a lower speed. However, there is a problem with the conventional technique in that computation error of the calculated revolution becomes larger as the rotating speed of the motor becomes lower. For example, let us consider a case where the count value of the output pulses is 8. In this case, a certain revolution is calculated by the calculating unit. However, an actual revolution is different between in a case where the revolution is calculated immediately after the eighth output pulse is output and in a case where the revolution is calculated immediately before the ninth output pulse is output. Therefore, the calculated revolution may differ greatly from the actual revolution.

Moreover, accuracy of the calculation of revolution also depends to the number of pulses (referred to as a "pulse number" hereinafter) output during the motor makes one rotation. The pulse number with regard to a typical sensor is, for example, 1000 to 2000. However, the pulse number with regard to a "bearing sensor" consisting of ball bearings and a pulse sensor is at most 100 to 200 because of its structure. In a case where the revolution of the motor is the same, the typical sensor associated with the large pulse number outputs more detection pulses than the bearing sensor associated with the small pulse number, as shown in FIG. 1. Therefore, when the bearing sensor is used, the number of pulses which the calculating unit receives during a sampling period is relatively small and hence the error of the calculated revolution is increased. In particular, when the motor rotates at a low speed, the number of pulses which the calculating unit receives becomes extremely small and thus the error of the calculated revolution becomes extremely large. This is not preferable from the viewpoint of the stable control of the vehicle.

Meanwhile, the above-mentioned bearing sensor is favorable in terms of cost and size. For example, a battery forklift is often equipped with the bearing sensor having a small pulse number. In this case, the cost can be reduced, and a large working space for an operator of the battery forklift can be obtained. It is desired to improve stability of a vehicle equipped with the bearing sensor such as the forklift. It is particularly desired to improve the stability when the vehicle runs at a low-speed.

Japanese Laid-Open Patent Application (JP-A-Heisei, 10-38906) discloses a technique relating to the detection of the rotating speed. According to the technique disclosed in the patent document, a pulse width of a pulse signal is detected at a predetermined calculation timing on the basis of a middle edge calculating method. When a change in a pulse signal has been detected, the pulse width of the pulse signal is measured at the calculation timing. On the other hand, when a change in a pulse signal has not been detected, the pulse width of at the calculation timing is estimated on the basis of a difference between the latest pulse width and the previous pulse width.

SUMMARY OF THE INVENTION

The present invention reduces an error of revolution calculated by a rotating speed detecting apparatus having a bearing sensor. Particularly, the present invention provides a technique which can reduce the error even in a case where a motor rotates at a low-speed.

The present invention also improves reliability of a rotating speed detecting apparatus having a bearing sensor.

The present invention also improves stability of a vehicle having a bearing sensor. Particularly, the present invention provides a technique which can control the vehicle stably even in a case where the vehicle runs at a low-speed.

The present invention also provides a forklift having excellent reliability with reduced cost.

In one aspect of the present invention, a rotating speed detecting apparatus is provided. The rotating speed detecting apparatus has: a bearing sensor configured to detect rotation of a motor and output detection pulses whose frequency depending on a rotating speed of the motor; and a calculating unit configured to receive the detection pulses from the bearing sensor. The detection pulses include a first pulse and a second pulse output next to the first pulse. The calculating unit calculates a revolution of the motor from a "pulse interval (T)" between the first pulse and the second pulse.

In the rotating speed detecting apparatus, the calculating unit classifies rotation status of the motor into a plurality of stages. The plurality of stages include: a "low-speed stage" in which the calculating unit fixes the revolution to a predetermined value or less; and a "mid- to high-speed stage" in which the calculating unit calculates the revolution based on the pulse interval. When the second pulse is not output during a first overflow time after the first pulse is output in the mid- to high-speed stage, the calculating unit changes the rotation status from the mid- to high-speed stage to the low-speed stage.

The above-mentioned low-speed stage includes a "stop stage" and a "wait stage". In the stop stage, the calculating unit sets the revolution to 0. In the wait stage, the calculating unit sets the revolution to the predetermined value. When the second pulse is not output during the first overflow time after the first pulse is output in the mid- to high-speed stage, the calculating unit changes the rotation status from the mid- to high-speed stage to the wait stage.

When not receiving the detection pulses within the first overflow time of a start of the wait stage, the calculating unit changes the rotation status from the wait stage to the stop stage. On the other hand, when receiving the detection pulses within the first overflow time of a start of the wait stage, the calculating unit changes the rotation status from the wait stage to the mid- to high-speed stage. When receiving the detection pulses in the stop stage, the calculating unit immediately changes the rotation status from the stop stage to the wait stage.

It is preferable that the above-mentioned predetermined value is a revolution of the motor which is calculated by setting the first overflow time as the pulse interval.

The mid- to high-speed stage includes at least a "first stage" and a "second stage". When the second pulse is not output during the first overflow time after the first pulse is output in the first stage, the calculating unit changes the rotation status from the first stage to the low-speed stage. When the second pulse is not output during a second overflow time after the first pulse is output in the second stage, the calculating unit changes the rotation status from the second stage to the first stage. Here, the second overflow time is set shorter than the first overflow time.

When the calculated revolution becomes larger than a first revolution in the first stage, the calculating unit changes the rotation status from the first stage to the second stage. When the calculated revolution becomes smaller than a second revolution in the second stage, the calculating unit changes the rotation status from the second stage to the first stage. The second revolution is set lower than the first revolution.

The above-mentioned rotating speed detecting apparatus is mounted on a vehicle. Preferably, the above-mentioned rotating speed detecting apparatus is mounted on a forklift.

According to the present invention, an error of the revolution calculated by the rotating speed detecting apparatus having the bearing sensor is reduced. In particular, the error can be reduced even in a case when the motor rotates at a low-speed. As a result, the reliability of the rotating speed detecting apparatus is improved.

Moreover, according to the present invention, the stability of a vehicle having the bearing sensor is improved. In particular, it is possible according to the present invention to control the vehicle stably even in a case when the vehicle runs at a low-speed.

Furthermore, according to the present invention, a forklift having excellent reliability is provided. Since the forklift is equipped with the bearing sensor, the cost is reduced and a working space for an operator is enlarged.

BRIEF DESCRIPTION OF THE DRAWINGS

FIG. 5 is another conceptual view showing the method of detecting the rotating speed according to the present embodiment; and FIG. 6 is a timing chart showing an example of an operation of the rotating speed detecting apparatus according to the present embodiment.

DETAILED DESCRIPTION OF THE INVENTION

Embodiments of the present invention will be described below with reference to the attached drawings.

Figure 1:
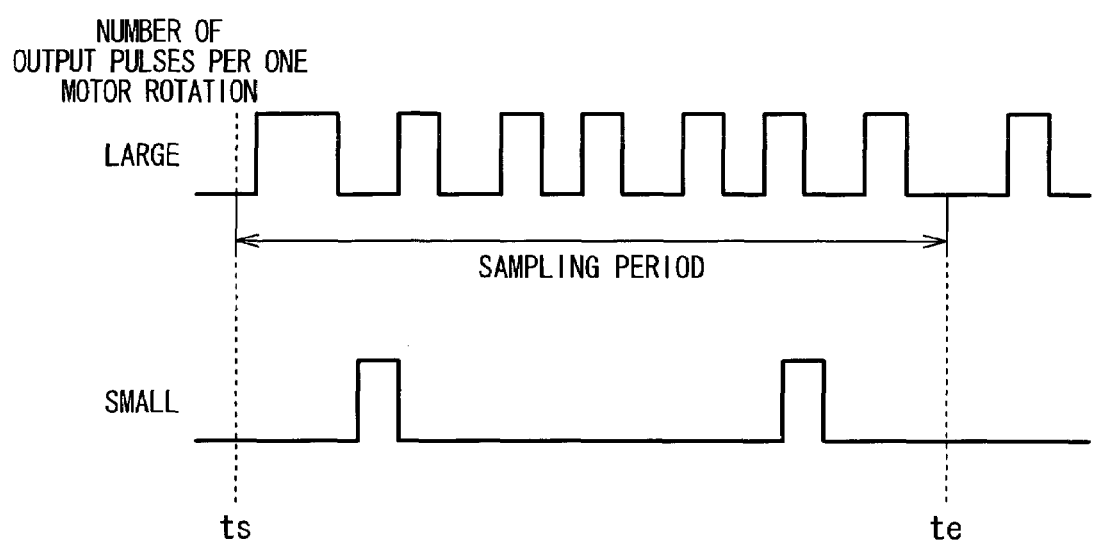
FIG. 1 is a figure for explaining a conventional method of calculating a rotating speed.
Figure 2:
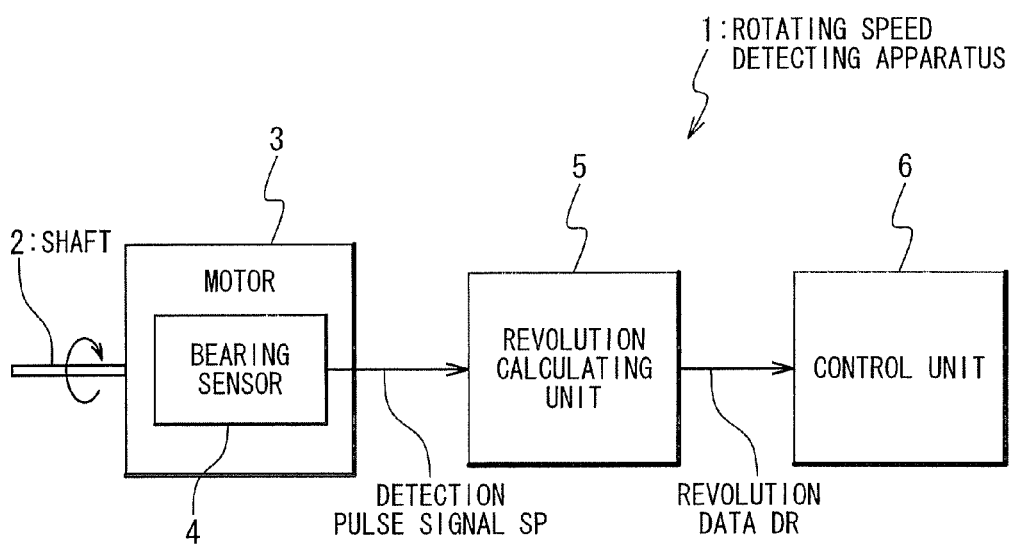
FIG. 2 is a block diagram showing a constitution of a system equipped with a rotating speed detecting apparatus according to an embodiment of the present invention.
Figure 2:
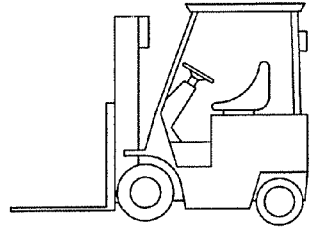
Figure 2:
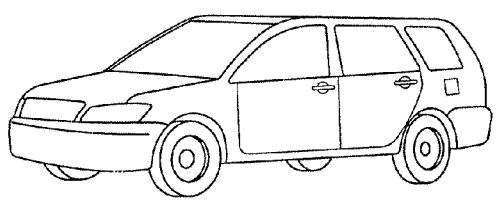

FIG. 2 is a block diagram showing a constitution of a system equipped with a rotating speed detecting apparatus according to an embodiment of the present invention. A rotating speed detecting apparatus 1 is mounted on an apparatus having a motor 3 which rotates a shaft 2. For example, the rotating speed detecting apparatus 1 according to the present embodiment is mounted on a vehicle such as a forklift. The rotating speed detecting apparatus 1 is configured to detect revolution of the motor 3.

More specifically, the rotating speed detecting apparatus 1 has a bearing sensor 4 and a revolution calculating unit 5. The bearing sensor 4 has ball bearings and a pulse sensor, and detects the rotation of the motor 3. The bearing sensor 4 outputs detection pulse signals (detection pulses) SP indicating that the rotations of the motor 3 are detected. The frequency of the detection pulses depends on the rotating speed of the motor 3. That is, the number of output detection pulses is increased as the motor 3 rotates at a higher speed. On the other hand, the number of output detection pulses is decreased as the motor 3 rotates at a lower speed. In other words, the bearing sensor 4 outputs a detection pulse group in accordance with the rotation of the motor 3. The number of the detection pulses (referred to as a "pulse number" hereinafter) which are output during the motor 3 makes one rotation is, for example, 100.

The detection pulse signals (detection pulse group) SP output from the bearing sensor 4 is input to the revolution calculating unit 5. Namely, the revolution calculating unit 5 receives the detection pulse signals SP. The revolution calculating unit 5 has a processor, and calculates revolution (rotating speed) of the motor 3 on the basis of the received detection pulse group. A concrete method of the calculation will be described later in detail. A revolution data DR indicates the revolution calculated by the revolution calculating unit 5. The revolution data DR is output to a control unit 6 which controls the system. The control unit 6 controls an operation of the vehicle based on the calculated revolution. For example, the control unit 6 controls braking with reference to the calculated revolution.

Figure 3:
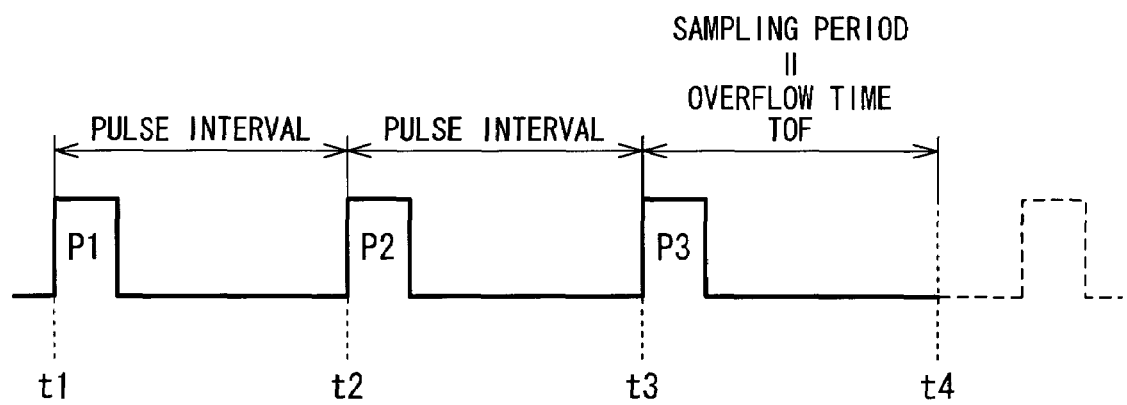
FIG. 3 shows a figure for explaining a method of calculating a rotating speed according to the present embodiment.

FIG. 3 is a figure for explaining a method of calculating the revolution (rotating speed) by the revolution calculating unit 5 according to the present embodiment. Shown in FIG. 3 are detection pulses which are input from the bearing sensor 4 to the revolution calculating unit 5. According to the present embodiment, the revolution of the motor 3 is calculated by measuring a "pulse interval" instead of counting the number of the detection pulses. Here, the "pulse interval" is defined as an interval between a certain detection pulse and the next detection pulse that is output next to the certain detection pulse. For example, in FIG. 3, a period from a time t1 when a first detection pulse P1 is received to a time t2 when a second detection pulse P2 is received corresponds to one pulse interval. Also, a period from the time t2 when the second detection pulse P2 is received to a time t3 when a third detection pulse P3 is received corresponds to one pulse interval.

When the pulse number of the bearing sensor 4 is given by "N" and a pulse interval is given by "T [ms]", the revolution "RPM [rpm]" of the motor 3 is expressed by the following equation (1).

$$RPM = (60 \times 1000)/(N \times T) \tag{1}$$

For example, when the pulse number N (a predetermined number) is 100, the revolution RPM of the motor 3 is expressed by the following equation (2).

$$RPM[rpm] = 600/T[ms] \tag{2}$$

For example, when the pulse interval T is 100 ms, the revolution of the motor 3 is calculated to be 6 rpm.

In a case when the number of pulses during a predetermined sampling period is counted as in the conventional technique, the revolution of motor is only estimated. When the count value is 2, for example, an actual revolution is different between in a case where the predetermined sampling period ends immediately after the second pulse is output and in a case where the predetermined sampling period ends immediately before the third pulse is output. However, the revolution calculated from the count value (=2) is just one kind. Thus, an error occurs between the calculated revolution and the actual revolution. The error becomes more conspicuous as the rotating speed of the motor 3 becomes lower.

According to the present embodiment, the revolution calculating unit 5 calculates the revolution RPM of the motor 3 directly from the pulse interval. Therefore, the revolution RPM of the motor 3 can be calculated correctly whether the pulse interval becomes longer or shorter. In other words, the revolution RPM can be calculated correctly based on the above-mentioned equation (1) whether the motor 3 rotates at a high-speed or a low-speed. According to the present invention, as described above, the error of the revolution RPM calculated by the rotating speed detecting apparatus 1 is reduced, and thereby its reliability is improved. In particular, when the motor 3 rotates at a low speed, or when the pulse number is small, the error is remarkably reduced. Therefore, the rotating speed detecting apparatus 1 according to the present invention is preferable in a case when a bearing sensor having a small pulse number is used.

Next, let us consider cases where the motor 3 rotates at an extremely low-speed and where the rotation stops. In these cases, an interval between a certain detection pulse and the next detection pulse is extremely long, or the next detection pulse is not output. Therefore, when the revolution RPM of the motor 3 is calculated simply from the pulse interval, a time required for calculating the revolution RPM may become extremely long, or the revolution RPM may not be calculated forever. This brings out a problem in controlling the vehicle by the control unit 6. Therefore, according to the present invention, a concept of "overflow time" is introduced.

If the next detection pulse is not output during a predetermined overflow time after a detection pulse is output, the revolution calculating unit 5 sets a certain value as the revolution RPM of the motor 3. In the case of the example shown in FIG. 3, a predetermined period from the time t3 to a time t4 is the overflow time TOF. After the third detection pulse P3 is output at the time t3, the next detection pulse is not output by the time t4. Therefore, the revolution calculating unit 5 sets the revolution RPM of the motor 3 to a certain value at the time t4.

Figure 4:
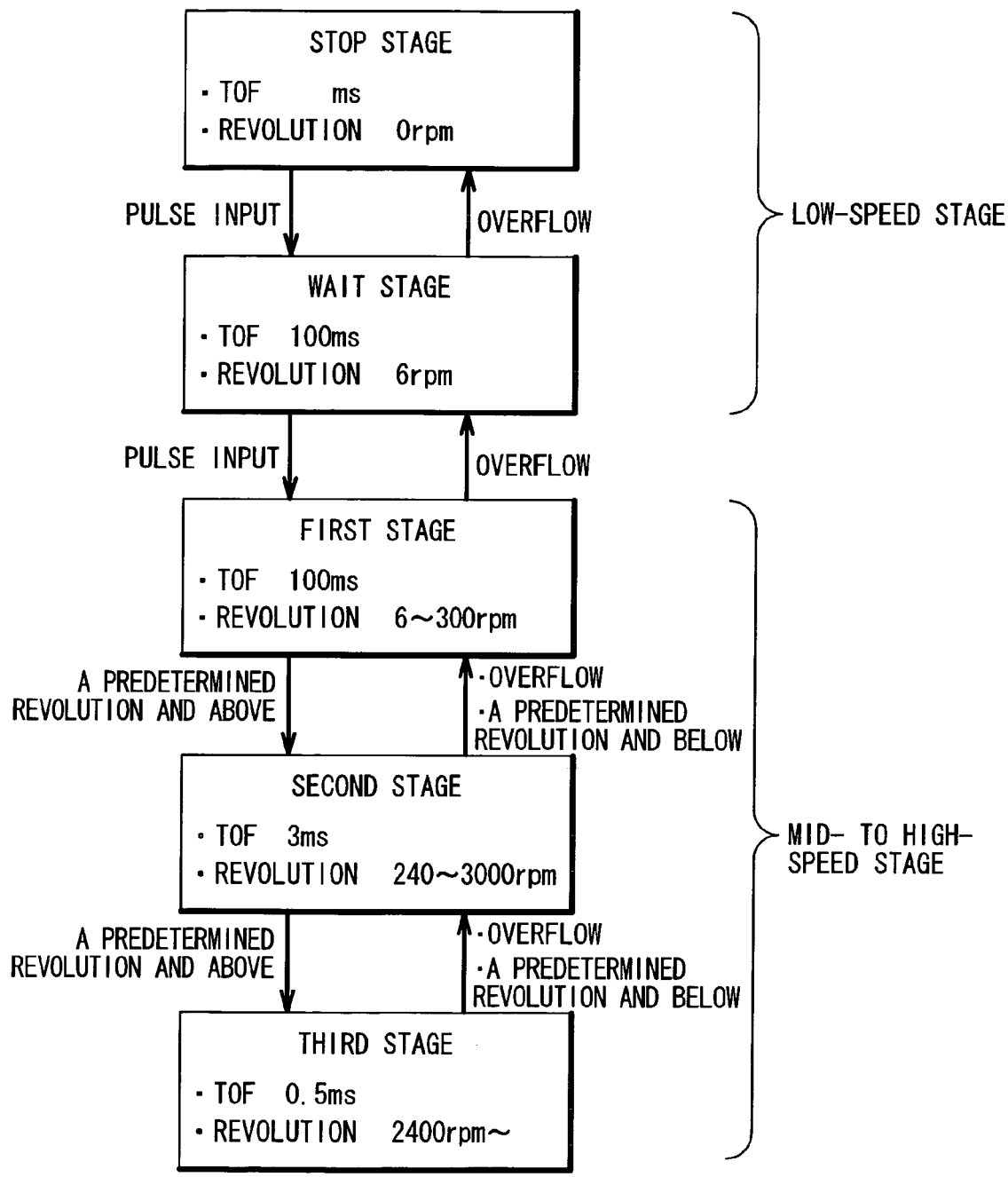
FIG. 4 is a conceptual view showing a method of detecting the rotating speed according to the present embodiment.

In order to utilize the overflow time TOF effectively, the revolution calculating unit 5 according to the present embodiment classifies rotation status of the motor 3 into a plurality of stages based on the revolution RPM (or the pulse interval) of the motor 3. FIGS. 4 and 5 are figures for explaining an example of the plurality of stages and transition between the plurality of stages, respectively. In the example to be described below, the pulse number N is set to 100, and the above-mentioned equation (2) is used for calculating the revolution RPM.

As shown in FIG. 4, the plurality of stages are classified into a "low-speed stage" and a "mid- to high-speed stage". More specifically, the low-speed stage is classified into a "stop stage" and a "wait stage". As shown in FIGS. 4 and 5, the revolution RPM is set to 0 rpm in the "stop stage", and the revolution RPM is set to 6 rpm in the "wait stage". As described above, in the low-speed stage, the revolution calculating unit 5 fixes the revolution RPM of the motor 3 to a predetermined value. On the other hand, the mid- to high-speed stage is classified into a "first stage", a "second stage" and a "third stage". As shown in FIGS. 4 and 5, the "first stage" corresponds to a status that the revolution RPM is in a range from 6 to 300 rpm, the "second stage" corresponds to a status that the revolution RPM is in a range from 240 to 3000 rpm, and the "third stage" corresponds to a status that the revolution RPM is in a range from 2400 rpm or more. In the mid- to high-speed stage, the revolution calculating unit 5 calculates the revolution RPM of the motor 3 on the basis of the pulse interval as described above.

Next, an algorithm of transition between the plurality of stages is described in detail. First, it is supposed that the rotation status of the motor 3 is in the "first stage". In the first stage, the overflow time TOF is set to 100 ms (first overflow time). The first overflow time corresponds to a critical value (maximum value) of the pulse interval T which can be detected in the first stage. When the pulse interval T is the first overflow time 100 ms (critical status), the revolution RPM is "6 rpm" as is clear from the above equation (2). The revolution of 6 rpm corresponds to a critical value (minimum value) of the revolution RPM which can be obtained in the first stage (see FIG. 5).

In the "first stage", the revolution calculating unit 5 calculates the revolution RPM of the motor 3 based on the pulse interval. However, when the next detection pulse is not output during the first overflow time after a detection pulse is output, the revolution calculating unit 5 determines that the overflow occurs. In other words, when the revolution RPM becomes less than 6 rpm, the revolution calculating unit 5 determines that the overflow occurs. In that case, the revolution calculating unit 5 changes the rotation status from the "first stage" to the "wait stage". When the revolution calculating unit 5 detects an overflow, the timing of the pulse interval is reset.

In the "wait stage", the revolution RPM is set to 6 rpm. The revolution (6 rpm) is equal to the above-mentioned critical value. The overflow time TOF is set to the first overflow time (100 ms) also in the wait stage. As mentioned above, the timing of the pulse interval is reset at the time of the transition from the first stage to the wait stage, and the next timing of the pulse interval starts from a start time of the wait stage.

When a detection pulse is not output within the first overflow time of the start of the wait stage, the revolution calculating unit 5 determines that an overflow occurs. In this case, the revolution calculating unit 5 changes the rotation status from the "wait stage" to the "stop stage". On the other hand, when a detection pulse is output within the first overflow time of the start of the wait stage, the revolution calculating unit 5 changes the rotation status from the "wait stage" to the "first stage". As described above, the operation in the wait stage depends on whether or not the revolution calculating unit 5 receives a detection pulse within the first overflow time (100 ms). In that sense, the first overflow time is equivalent to the sampling period. If a detection pulse is output within the sampling period, the rotation status transits to the "first stage". If a detection pulse is not output within the sampling period, the rotation status transits to the "stop stage". Therefore, the first overflow time can be determined based on a response time allowed in the system.

In the "stop stage", the revolution RPM is set to 0 rpm. In the stop stage, the revolution calculating unit 5 focuses attention on whether the detection pulse is output or not. If the revolution calculating unit 5 receives a detection pulse, the revolution calculating unit 5 immediately changes the rotation status from the "stop stage" to the "wait stage". It should be noted that the rotation status does not jump from the "stop stage" to the "first stage". In a transition from the stop stage to the first stage, the rotation status always passes the "wait stage". That is, the revolution RPM is once changed from 0 rpm to 6 rpm, and then determined on the basis of the pulse interval. Since a rapid change in the revolution RPM is suppressed, the vehicle controlling by the control unit 6 is stabilized. In particular, it is possible to stably control the vehicle even in the case of extremely low-speed.

A revolution region allocated to the first stage is in a range from 6 rpm to 300 rpm. When the calculated revolution RPM becomes larger than 300 rpm (first revolution) in the first stage, the rotation status shifts from the "first stage" to the "second stage", and the second stage is started from the next cycle.

A revolution region allocated to the "second stage" is in a range from 240 rpm to 3000 rpm. The overflow time TOF is set to 3 ms (second overflow time) in the second stage. Thus, the overflow time TOF is set to a different value between in the first stage and in the second stage. In the second stage, the revolution calculating unit 5 calculates the revolution RPM of the motor 3 based on the pulse interval. When the calculated revolution RPM becomes smaller than 240 rpm (second revolution), the rotation status shifts from the "second stage" to the "first stage", and the first stage is started from the next cycle. When the calculated revolution RPM becomes larger than 3000 rpm, the rotation status shifts from the "second stage" to the "third stage", and the third stage is started from the next cycle.

Also, a case can be considered where the revolution of the motor 3 suddenly drops off in the second stage. The next detection pulse is not output during the second overflow time (3 ms) after a detection pulse is output. In this case, the revolution calculating unit 5 determines that an overflow occurs. Then, the revolution calculating unit 5 changes the rotation status from the "second stage" to the "first stage", and sets the revolution RPM to 240 rpm (lower limit value). When the revolution calculating unit 5 detects an overflow, the timing of the pulse interval is reset.

As described above, the second overflow time TOF in the second stage is different from the first overflow time TOF in the first stage. More specifically, the second overflow time (3 ms) is set shorter than the first overflow time (100 ms). The overflow time is equivalent to the sampling period, as mentioned above. Therefore, the sampling period becomes shorter as the motor rotates at higher speed, which makes it possible to control the vehicle more precisely. On the other hand, the sampling period becomes longer as the motor rotates at lower speed, which prevents excessive calculation of the rotating speed. Moreover, as shown in FIG. 5, the minimum revolution (240 rpm) in the second stage is set smaller than the maximum revolution (300 rpm) in the first stage. That is to say, the first stage and the second stage maintain a hysteresis relationship. As a result, a smooth transition between the stages can be achieved and hence the stability of the vehicle is increased.

A revolution region allocated to the "third stage" is in a range from 2400 rpm or more. In the third stage, the overflow time TOF is set to 0.5 ms (third overflow time). In the third stage, the revolution calculating unit 5 calculates the revolution RPM of the motor 3 based on the pulse interval. When the calculated revolution RPM becomes smaller than 2400 rpm, the rotation status shifts from the "third stage" to the "second stage", and the second stage is started from the next cycle. As shown in FIG. 5, the minimum revolution (2400 rpm) in the third stage is set smaller than the maximum revolution (3000 rpm) in the second stage. That is to say, the second stage and the third stage maintain a hysteresis relationship. As a result, a smooth transition between the stages can be achieved and hence the stability of the vehicle is increased.

Also, a case can be considered where the next detection pulse is not output during the third overflow time (0.5 ms) after a detection pulse is output in the third stage. In this case, the revolution calculating unit 5 determines that an overflow occurs. Then, the revolution calculating unit 5 changes the rotation status from the "third stage" to the "second stage", and sets the revolution RPM to 2400 rpm (lower limit value). When the revolution calculating unit 5 detects an overflow, the timing of the pulse interval is reset. As described above, the third overflow time (0.5 ms) is set shorter than the second overflow time (3 ms). Therefore, the sampling period becomes shorter as the motor rotates at higher speed, which makes it possible to control the vehicle more precisely. On the other hand, the sampling period becomes longer as the motor rotates at lower speed, which prevents excessive calculation of the rotating speed.

FIG. 6 is a timing chart showing an example of the operation of the rotating speed detecting apparatus according to the present invention. At first, the rotation status is in the first stage. Then, a detection pulse is input at a time t1, and a revolution RPM is calculated to be 20 rpm based on the pulse interval at that time. The next detection pulse is input at a time t2, and a revolution RPM is calculated to be 10 rpm based on a pulse interval (60 ms) determined at that time (see equation (2)).

The next detection pulse is not input during the first overflow time (100 ms) from the time t2 to a time t3. Therefore, the revolution calculating unit 5 determines that an overflow occurs, and changes the rotation status to the wait stage at the time t3. At the same time, the revolution calculating unit 5 sets the revolution RPM to 6 rpm. The next detection pulse is not input during the first overflow time (100 ms) from the time t3 to a time t4. Therefore, the revolution calculating unit 5 determines that an overflow occurs, and changes the rotation status to the stop stage at the time t4. At the same time, the revolution calculating unit 5 sets the revolution RPM to 0 rpm.

A new detection pulse is input at a time t5. In response to the new detection pulse, the revolution calculating unit 5 immediately changes the rotation status from the stop stage to the wait stage. At the same time, the revolution calculating unit 5 sets the revolution RPM to 6 rpm. The next detection pulse is input at a time t6. Therefore, the revolution calculating unit 5 determines that an overflow does not occur, and changes the rotation status to the first stage at the time t6. The revolution RPM is calculated to be 10 rpm based on the pulse width (60 ms) determined at the time t6. The next detection pulse is input at a time t7, and the revolution RPM is calculated to be 15 rpm based on the pulse interval (40 ms) determined at that time.

As described above, the rotating speed detecting apparatus according to the present invention operates well even in the case of the extremely low-speed rotation (6 rpm or less), though the bearing sensor having a small pulse number is used. Since the first overflow time (100 ms) is set such that a suitable response time is achieved, the vehicle control is carried out without any problem even when the vehicle is running at an extremely low-speed. In other words, the bearing sensor which is favorable in terms of cost and size can be used with achieving the stable control in the low-speed operation.

In particular, since a bearing sensor is often used in a forklift, it is preferable to apply the present invention to the forklift. It is thereby possible to control the forklift stably, reduce the cost and enlarge the working space for an operator of the forklift. As described above, it is possible according to the present invention to provide the forklift having excellent reliability.

According to the present invention, the revolution calculating unit 5 calculates the revolution RPM of the motor 3 from the pulse interval. As a result, the error of the revolution RPM calculated when the pulse number is small can be reduced, and thus the reliability is improved. Moreover, the rotation status of the motor 3 is classified into a plurality of stages for controlling the vehicle. As shown in FIG. 5, the neighboring stages in the mid- to high-speed stage maintain the hysteresis relationship. As a result, the smooth transition between the stages can be achieved, and thus the stability of the vehicle is improved. Furthermore, the wait stage is prepared in the low-speed stage. As a result, the rapid change of the calculated revolution RPM can be suppressed in the low-speed stage, and thus the vehicle is controlled stably.

It will be obvious to one skilled in the art that the present invention may be practiced in other embodiments that depart from the above-described specific details. The scope of the present invention, therefore, should be determined by the following claims.

What is claimed is:

1. A rotating speed detecting apparatus, comprising:
    a bearing sensor configured to detect rotation of a motor and output detection pulses whose frequency depending on a rotating speed of said motor; and
    a calculating unit configured to receive said detection pulses from said bearing sensor,
    wherein said detection pulses include a first pulse and a second pulse output next to said first pulse, and
    said calculating unit calculates a revolution of said motor from a pulse interval between said first pulse and said second pulse,
    wherein said calculating unit classifies rotation status of said motor into a plurality of stages,
    said plurality of stages include:
        a low-speed stage in which said calculating unit fixes said revolution to a predetermined value or less; and
        a mid- to high-speed stage in which said calculating unit calculates said revolution based on said pulse interval,
    wherein when said second pulse is not output during a first overflow time after said first pulse is output in said mid- to high-speed stage, said calculating unit changes said rotation status from said mid- to high-speed stage to said low-speed stage.

2. The rotating speed detecting apparatus according to claim 1,
    wherein said low-speed stage includes a stop stage and a wait stage,
    said calculating unit sets said revolution to 0 in said stop stage, and
    said calculating unit sets said revolution to said predetermined value in said wait stage.

3. The rotating speed detecting apparatus according to claim 2,
    wherein when said second pulse is not output during said first overflow time after said first pulse is output in said mid- to high-speed stage, said calculating unit changes said rotation status from said mid- to high-speed stage to said wait stage.

4. The rotating speed detecting apparatus according to claim 3,
    wherein when not receiving said detection pulses within said first overflow time of a start of said wait stage, said calculating unit changes said rotation status from said wait stage to said stop stage, while when receiving said detection pulses within said first overflow time of a start of said wait stage, said calculating unit changes said rotation status from said wait stage to said mid- to high-speed stage.

5. The rotating speed detecting apparatus according to claim 4,
    wherein when receiving said detection pulses in said stop stage, said calculating unit changes said rotation status from said stop stage to said wait stage.

6. The rotating speed detecting apparatus according to claim 2,
    wherein said predetermined value is a revolution of said motor which is calculated by setting said first overflow time as said pulse interval.

7. The rotating speed detecting apparatus according to claim 1,
    wherein said predetermined value is a revolution of said motor which is calculated by setting said first overflow time as said pulse interval.

8. The rotating speed detecting apparatus according to claim 1,
    wherein said mid- to high-speed stage includes a first stage and a second stage,
    when said second pulse is not output during said first overflow time after said first pulse is output in said first stage, said calculating unit changes said rotation status from said first stage to said low-speed stage,
    when said second pulse is not output during a second overflow time after said first pulse is output in said second stage, said calculating unit changes said rotation status from said second stage to said first stage, and
    said second overflow time is set shorter than said first overflow time.

9. The rotating speed detecting apparatus according to claim 8,
    wherein when said calculated revolution becomes larger than a first revolution in said first stage, said calculating unit changes said rotation status from said first stage to said second stage, and
    when said calculated revolution becomes smaller than a second revolution in said second stage, said calculating unit changes said rotation status from said second stage to said first stage.

10. The rotating speed detecting apparatus according to claim 9,
    wherein said second revolution is set lower than said first revolution.

11. A vehicle, comprising:
    a motor;
    a bearing sensor configured to detect rotation of said motor and output detection pulses whose frequency depending on a rotating speed of said motor; and
    a calculating unit configured to receive said detection pulses from said bearing sensor,
    wherein said detection pulses include a first pulse and a second pulse output next to said first pulse, and said calculating unit calculates a revolution of said motor from a pulse interval between said first pulse and said second pulse, wherein said calculating unit classifies rotation status of said motor into a plurality of stages, said plurality of stages include:

a low-speed stage in which said calculating unit fixes said revolution to a predetermined value or less; and a mid- to high-speed stage in which said calculating unit calculates said revolution based on said pulse interval, wherein when said second pulse is not output during a first overflow time after said first pulse is output in said mid- to high-speed stage, said calculating unit changes said rotation status from said mid- to high-speed stage to said low-speed stage.

12. The vehicle according to claim 11, wherein said predetermined value is a revolution of said motor which is calculated by setting said first overflow time as said pulse interval.

13. The vehicle according to claim 11, wherein said mid- to high-speed stage includes a first stage and a second stage, when said second pulse is not output during said first overflow time after said first pulse is output in said first stage, said calculating unit changes said rotation status from said first stage to said low-speed stage, when said second pulse is not output during a second overflow time after said first pulse is output in said second stage, said calculating unit changes said rotation status from said second stage to said first stage, and said second overflow time is set shorter than said first overflow time.

14. A forklift, comprising:

a motor;

a bearing sensor configured to detect rotation of said motor and output detection pulses whose frequency depending on a rotating speed of said motor; and a calculating unit configured to receive said detection pulses from said bearing sensor, wherein said detection pulses include a first pulse and a second pulse output next to said first pulse, and said calculating unit calculates a revolution of said motor from a pulse interval between said first pulse and said second pulse, wherein said calculating unit classifies rotation status of said motor into a plurality of stages, said plurality of stages include:

a low-speed stage in which said calculating unit fixes said revolution to a predetermined value or less; and a mid- to high-speed stage in which said calculating unit calculates said revolution based on said pulse interval, wherein when said second pulse is not output during a first overflow time after said first pulse is output in said mid- to high-speed stage, said calculating unit changes said rotation status from said mid- to high-speed stage to said low-speed stage.

15. The forklift according to claim 14, wherein said predetermined value is a revolution of said motor which is calculated by setting said first overflow time as said pulse interval.

16. The forklift according to claim 14, wherein said mid- to high-speed stage includes a first stage and a second stage, when said second pulse is not output during said first overflow time after said first pulse is output in said first stage, said calculating unit changes said rotation status from said first stage to said low-speed stage, when said second pulse is not output during a second overflow time after said first pulse is output in said second stage, said calculating unit changes said rotation status from said second stage to said first stage, and said second overflow time is set shorter than said first overflow time.

* * * * *